United States Patent
Fellenstein et al.

(10) Patent No.: US 7,788,375 B2
(45) Date of Patent: Aug. 31, 2010

(54) COORDINATING THE MONITORING, MANAGEMENT, AND PREDICTION OF UNINTENDED CHANGES WITHIN A GRID ENVIRONMENT

(75) Inventors: Craig William Fellenstein, Brookfield, CT (US); Rick Allen Hamilton, II, Charlottesville, VA (US); Joshy Joseph, Poughkeepsie, NY (US); James W Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/364,469

(22) Filed: Feb. 2, 2009

(65) Prior Publication Data

US 2009/0138594 A1 May 28, 2009

Related U.S. Application Data

(63) Continuation of application No. 11/031,541, filed on Jan. 6, 2005, now Pat. No. 7,533,170.

(51) Int. Cl.
*G06F 15/173* (2006.01)
(52) U.S. Cl. .................. 709/224; 709/205; 709/218; 709/220; 709/249; 709/251
(58) Field of Classification Search .......... 709/205, 709/218, 220, 224, 249, 251
See application file for complete search history.

(56) References Cited

U.S. PATENT DOCUMENTS

| | | | |
|---|---|---|---|
| 5,640,569 A | 6/1997 | Miller et al. | |
| 5,905,975 A | 5/1999 | Ausubel | |
| 6,003,075 A * | 12/1999 | Arendt et al. | ............... 709/221 |
| 6,021,398 A | 2/2000 | Ausubel | |
| 6,023,612 A | 2/2000 | Harris et al. | |
| 6,167,445 A | 12/2000 | Gai et al. | |
| 6,310,889 B1 | 10/2001 | Parsons et al. | |
| 6,430,711 B1 | 8/2002 | Sekizawa | |
| 6,480,955 B1 * | 11/2002 | DeKoning et al. | .......... 713/100 |
| 6,552,813 B2 | 4/2003 | Yacoub | |
| 6,647,373 B1 | 11/2003 | Carlton-Foss | |

(Continued)

OTHER PUBLICATIONS

Rolia, Jerry et al, "Service Centric Computing—Next Generation Internet Computing", 2002, Springer-Verlag Berlin Heidelberg, pp. 463-479.

(Continued)

*Primary Examiner*—Michael Won
(74) *Attorney, Agent, or Firm*—William H. Steinberg; Amy J. Pattillo (57) ABSTRACT

A method, system, and program for coordinating the monitoring, management, and prediction of unintended changes within a grid environment are provided. A grid change controller within a particular grid environment detects an unintended change within that grid environment. In particular, grid change controller monitors potential change indicators received from multiple disparate resource managers across the grid environment, where each resource manage manages a selection of resources within the grid environment. The grid change controller then determines a necessary response to the unintended change within the grid environment and communicates with at least one independent manager within the grid environment to resolve the unintended change, such that the grid change controller facilitates recovery from the unintended change within the grid environment to maintain performance requirements within the grid environment.

18 Claims, 5 Drawing Sheets

U.S. PATENT DOCUMENTS

| | | | |
|---|---|---|---|
| 6,654,807 B2 | 11/2003 | Farber et al. | |
| 6,717,694 B1 | 4/2004 | Fukunaga et al. | |
| 6,816,905 B1 | 11/2004 | Sheets et al. | |
| 6,963,285 B2 | 11/2005 | Fischer et al. | |
| 7,050,184 B1 | 5/2006 | Miyamoto | |
| 7,055,052 B2 | 5/2006 | Chalasani et al. | |
| 7,080,077 B2 | 7/2006 | Ramamurthy et al. | |
| 7,093,259 B2 * | 8/2006 | Pulsipher et al. | 718/106 |
| 7,096,248 B2 | 8/2006 | Masters et al. | |
| 7,124,062 B2 * | 10/2006 | Gebhart | 702/186 |
| 7,171,654 B2 | 1/2007 | Werme et al. | |
| 7,181,743 B2 | 2/2007 | Werme et al. | |
| 7,243,147 B2 * | 7/2007 | Hodges et al. | 709/224 |
| 7,272,732 B2 | 9/2007 | Farkas et al. | |
| 7,293,092 B2 * | 11/2007 | Sukegawa | 709/226 |
| 7,340,654 B2 * | 3/2008 | Bigagli et al. | 714/47 |
| 7,433,931 B2 | 10/2008 | Richoux | |
| 7,451,106 B1 | 11/2008 | Gindlesperger | |
| 7,472,112 B2 | 12/2008 | Pfleiger et al. | |
| 7,533,168 B1 | 5/2009 | Pabla et al. | |
| 7,552,437 B2 | 6/2009 | Di Luoffo et al. | |
| 7,562,143 B2 | 7/2009 | Fellenstein et al. | |
| 7,584,274 B2 | 9/2009 | Bond et al. | |
| 2002/0116488 A1 * | 8/2002 | Subramanian et al. | 709/224 |
| 2003/0041010 A1 | 2/2003 | Yonao-Cowan | |
| 2003/0088671 A1 | 5/2003 | Klinker et al. | |
| 2003/0195813 A1 | 10/2003 | Pallister et al. | |
| 2004/0095237 A1 * | 5/2004 | Chen et al. | 340/506 |
| 2004/0098606 A1 | 5/2004 | Tan et al. | |
| 2004/0145775 A1 | 7/2004 | Kubler et al. | |
| 2004/0213220 A1 | 10/2004 | Davis | |
| 2004/0215590 A1 | 10/2004 | Kroening | |
| 2004/0225711 A1 | 11/2004 | Burnett et al. | |
| 2005/0021349 A1 | 1/2005 | Chiliotis et al. | |
| 2005/0021742 A1 * | 1/2005 | Yemini et al. | 709/224 |
| 2005/0027691 A1 | 2/2005 | Brin et al. | |
| 2005/0044228 A1 | 2/2005 | Birkestrand et al. | |
| 2005/0065994 A1 * | 3/2005 | Creamer et al. | 709/202 |
| 2005/0132041 A1 * | 6/2005 | Kundu | 709/224 |
| 2005/0138162 A1 | 6/2005 | Byrnes | |
| 2005/0138175 A1 | 6/2005 | Kumar et al. | |
| 2005/0182838 A1 | 8/2005 | Sheets et al. | |
| 2005/0187797 A1 * | 8/2005 | Johnson | 705/3 |
| 2005/0187977 A1 | 8/2005 | Frost | |
| 2005/0257079 A1 | 11/2005 | Arcangeli | |
| 2006/0069621 A1 | 3/2006 | Chang et al. | |
| 2006/0075041 A1 * | 4/2006 | Antonoff et al. | 709/206 |
| 2006/0075042 A1 | 4/2006 | Wang et al. | |
| 2006/0288251 A1 | 12/2006 | Jackson | |
| 2006/0294218 A1 * | 12/2006 | Tanaka et al. | 709/224 |

OTHER PUBLICATIONS

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Office Action, U.S. Appl. No. 11/031,403, filed Jan. 6, 2005, Mailed Apr. 24, 2009.

Office Action, U.S. Appl. No. 11/031,426, filed Jan. 6, 2005, Mailed Apr. 1, 2009.

Notice of Allowance, U.S. Appl. No. 10/868,542, filed Jun. 15, 2004, Mailed Apr. 16, 2009.

Cao et al, GridFlow: Workflow management for grid computing, C&C Res. Labs, NEC Eur Ltd, Germany: This paper appears in : Cluster Computing and Grid, 2003. Proceedings. CCGrid 2003. 3rd IEEE/ACL International Symposium; Publication date: May 12-15, 2003, 8 pages.

"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.

USPTO Office Action Response in pending U.S. Appl. No. 11/031,490 (filed Jan. 6, 2005), Craig William Fellenstein et al, Mailing date: May 29, 2009, 10 pages.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

Office Action, U.S. Appl. No. 12/211,243, filed Sep. 16, 2008, Di Luoffo et al, Mailed Aug. 12, 2009, pp. 1-18.

Office Action, U.S. Appl. No. 11/031,542, filed Jan. 6, 2005, Dawson et al, Mailed Jul. 7, 2009, pp. 1-15.

Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.

Moore et al, "Managing Mixed Use Clusters with Cluster on Demand", Duke University, Nov. 2002.

"IBM Girds for Grids". McConnell, Chris. Enterprise System Journal, Oct. 2001, 1 page.

"Grid Computing set for big growth". Tanner, John, America's Network, vol. 107, No. 8, May 15, 2003, 6 pages.

Office Action, U.S. Appl. No. 12/125,892, filed May 22, 2008, mailed Aug. 26, 2009.

Office Action, U.S. Appl. No. 12/125,879, filed May 22, 2008, mailed Sep. 15, 2009.

Notice of Allowance, U.S. Appl. No. 12/194,989, filed Aug. 20, 2008, mailed Sep. 30, 2009.

Office Action, U.S. Appl. No. 11/031,426, filed Jan. 6, 2005, Carl Philip Gusler et al., mailed Nov. 13, 2009, 21 pages.

Notice of Allowance, U.S. Appl. No. 11/031,403, filed Jan. 6, 2005, Leslie Mark Ernest et al., mailed Oct. 5, 2009, 15 pages.

In re Fellenstein, Notice of Allowance, U.S. Appl. No. 12/125,879, filed May 22, 2008, mail date Jan. 29, 2010, 24 pages.

In re Fellenstein, Notice of Allowance, U.S. Appl. No. 11/031,490, filed Jan. 6, 2005, mail date Mar. 9, 2010, 12 pages.

In re Fellenstein, Notice of Allowance, U.S. Appl. No. 12/359,216, filed Jan. 23, 2009, mail date Feb. 1, 2010, 25 pages.

In re Vincent Valentino Di Luoffo, Notice of Allowance, U.S. Appl. No. 12/211,243, filed Sep. 16, 2003, mail date Dec. 31, 2009, 18 pages.

In re Fellenstein, Notice of Allowance, U.S. Appl. No. 10/940,452, filed Sep. 14, 2004, mail date Dec. 16, 2009, 28 pages.

In re Fellenstein, Notice of Allowance, U.S. Appl. No. 11/031,542, filed Jan. 6, 2005, mail date Dec. 8, 2009, 35 pages.

In re Fellenstein, Office Action, U.S. Appl. No. 12/491,172, filed Jun. 24, 2009, mail date Apr. 6, 2010, 30 pages.

In re Fellenstein, Office Action, U.S. Appl. No. 12/196,287, filed Aug. 22, 2008, mail date Mar. 30, 2010, 24 pages.

In re Fellenstein, Office Action, U.S. Appl. No. 11/031,489, filed Jan. 6, 2005, mail date Apr. 5, 2010, 28 pages.

TTI Cluster Computing Services On Demand, ClusterOnDemand. com, publicly available and archived by Arhive.org on or before Dec. 8, 2004, 4 pages.

* cited by examiner

COORDINATING THE MONITORING, MANAGEMENT, AND PREDICTION OF UNINTENDED CHANGES WITHIN A GRID ENVIRONMENT

CROSS-REFERENCE TO RELATED APPLICATIONS:

This application is a continuation of commonly assigned U.S. patent application Ser. No. 11/031,541, filed Jan. 6, 2005, which is hereby incorporated herein by reference.

BACKGROUND OF THE INVENTION

1. Technical Field

The present invention relates in general to improved grid computing and in particular to coordinating overall grid environment error management. Still more particularly, the present invention relates to coordinating the monitoring, management, and prediction of unintended changes within a grid environment.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

While the open standards defining grid technology facilitate sharing and coordination of diverse resources in dynamic, distributed, virtual organizations, grid standards do not solve all of the problems associated with linking resources with different policies and management systems. In particular, one problem associated with linking resources with different policies and management systems is that each set of resources may detect errors and respond to errors in a different way, if at all. This problem is further compounded when a grid job is distributed among resources managed by different management systems, where each management system may respond to errors in a different way.

Ultimately, the problem of lack of consistency in detecting and managing errors and other changes across a grid environment affects the ability of a grid environment to meet promised performance and quality of service for a grid job because there is not error recovery coordination between the different management systems and there is not a consistent standard for error detection and recovery across the different management systems. In view of the foregoing, there is a need for a centralized grid service that coordinates the monitoring, management, and prediction of not only resource errors, but other unintended changes within the grid environment that effect grid jobs. In particular, there is a need for a grid service enabled to communicate with the resource management systems distributed across the grid environment to monitor unintended changes and coordinate error recovery.

SUMMARY OF THE INVENTION

In view of the foregoing, the present invention in general provides for improved grid computing and in particular to coordinating overall grid environment change management. Still more particularly, the present invention relates to coordinating the monitoring, management, and prediction of unintended changes within a grid environment.

In one embodiment, a grid change controller detects an unintended change within the grid environment. In particular, grid change controller monitors potential change indicators received from multiple disparate resource managers across the grid environment, where each resource manage manages a selection of resources within the grid environment. The grid change controller then determines a necessary response to the unintended change within the grid environment and communicates with at least one independent manager within the grid environment to resolve the unintended change, such that the grid change controller facilitates recovery from the unintended change within the grid environment to maintain performance requirements within the grid environment.

In one example, a potential change indicator includes an error in a network layer, an infrastructure layer, or an application layer. In another example, potential change indicator includes an indicator of an unexpected change in a resource configuration of a selection of resources within the grid environment. In yet another example, a potential change indicator includes an error within a particular grid job executing within a particular execution environment.

In determining a necessary response to the unintended change within the grid environment, the grid change controller may determine whether a selection from among the independent managers are enabled to independently control recovery of the grid environment from the unintended change, and if so, initiate the recovery process by the selection of independent managers. Alternatively, the grid change controller may determine whether the grid environment will effect a particular grid job and coordinate the recovery process by at least one independent manager to recover a particular execution environment for the particular grid job from the unintended change. Further, the grid change controller may determine whether to renegotiate for additional or new resources for processing a grid job and communicate with the grid job router that controls resource distribution to facilitate recovery from the unintended change. Additionally, grid change controller may communicate with a system administrator to request aid with recovery from the unintended change.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
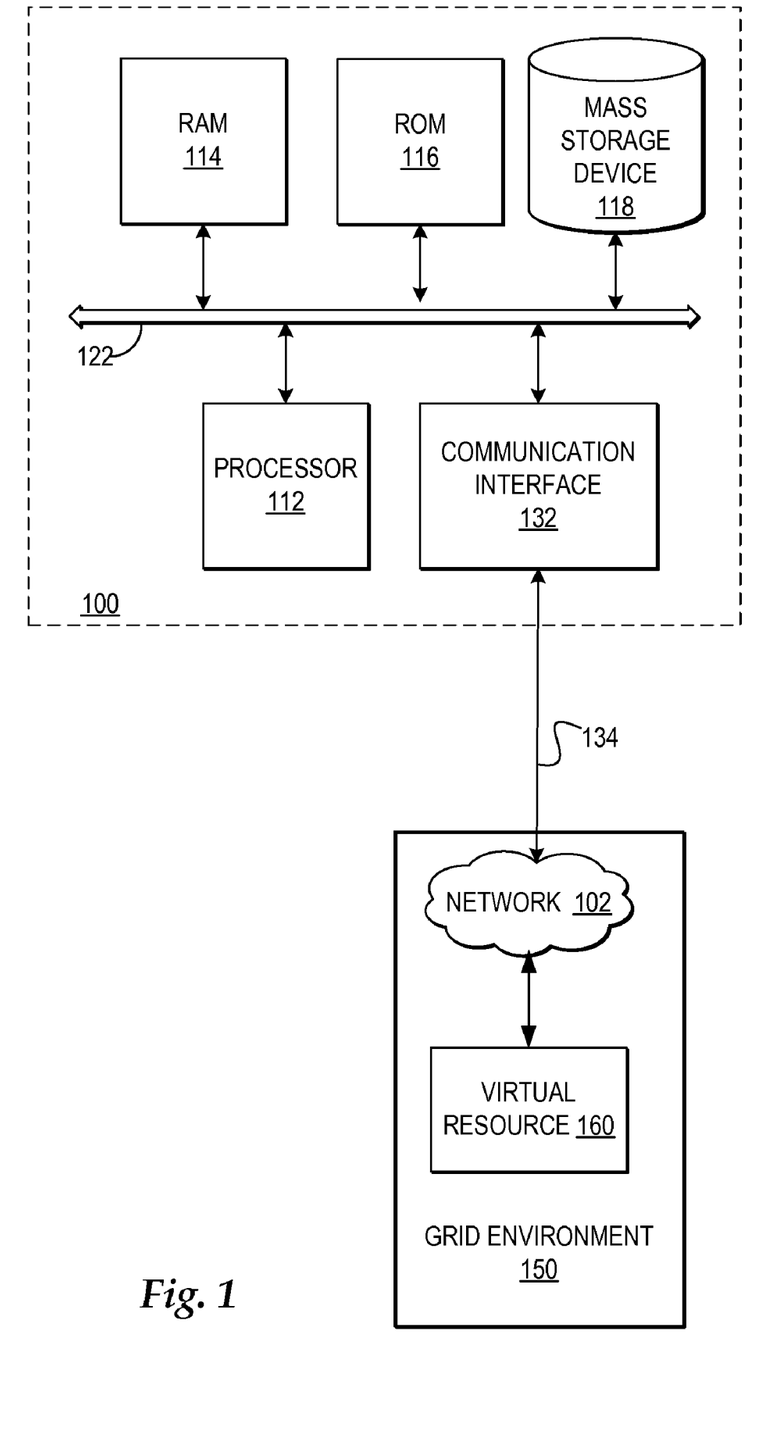
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 6 and 7 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
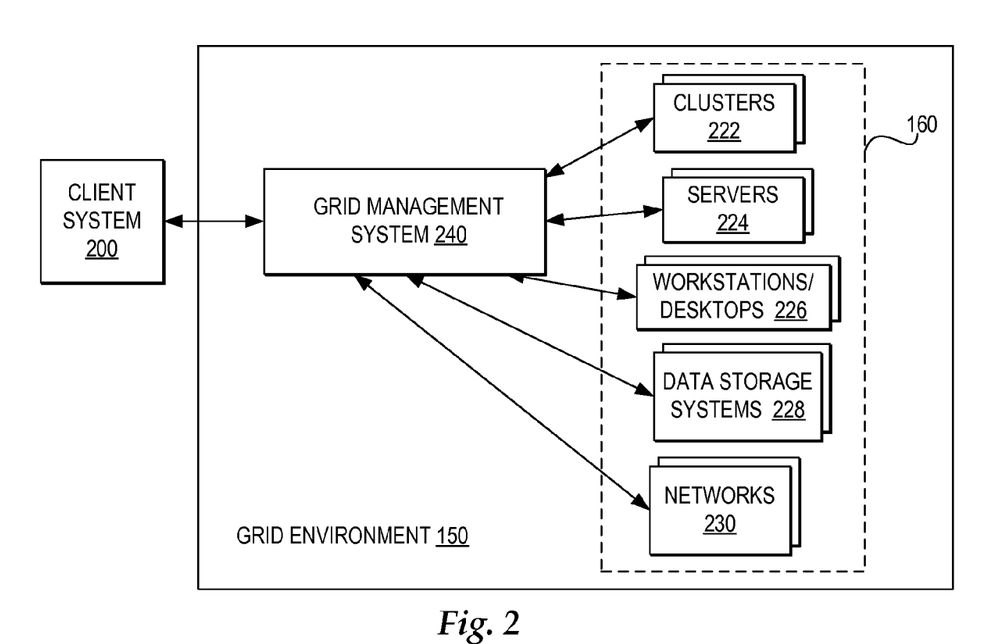
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems.

It will be understood that grid environment 150 may be provided by a grid vendor, where a cost for use of resources within grid environment 150 may be calculated based on the amount of time required for a grid job to execute or the actual amount of resources used, for example. In addition, it will be understood that grid environment 150 may include grid resources supplied by a single grid vendor, such as a particular business enterprise, or multiple vendors, where each vendor continues to monitor and manage the vendor's group of resources, but grid management system 240 is able to monitor unintended changes across all the resources, regardless of which vendors provide which resources. Further, it will be understood that although resource discovery mechanisms for discovering available grid resources are not depicted, client system 200 or grid management system 240 may discover grid resources advertised from local and global directories available within and outside of grid environment 150.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another.

In the example, client system 200 interfaces with grid management system 240. Client system 200 may represent any computing system sending requests to grid management system 240. In particular, client system 200 may send virtual job requests (or requests for a quote (RFQs) and jobs to grid management system 240. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

According to an advantage of the invention, grid management system 240 may include a centralized grid change manager, as will be further described, that monitors grid environment 150 for potential indicators of unintended changes within grid environment 150, determines whether it is necessary to resolve an unintended change within grid environment 150, attempts to resolve the unintended changes within the grid environment by communicating with other modules within the grid environment, and performs predictive analysis of the reliability of grid environment 150 to handle grid jobs, wherein the policies used to accept grid jobs may be adjusted based on the reliability factors in an attempt to avoid detrimental unintended changes in grid environment 150.

Figure 3:
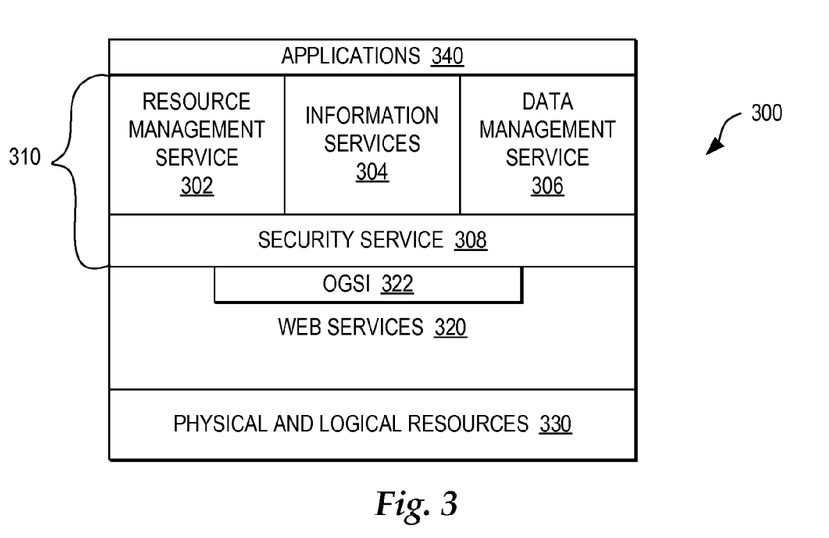
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services, that implemented together, may perform part of the management services provide by grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
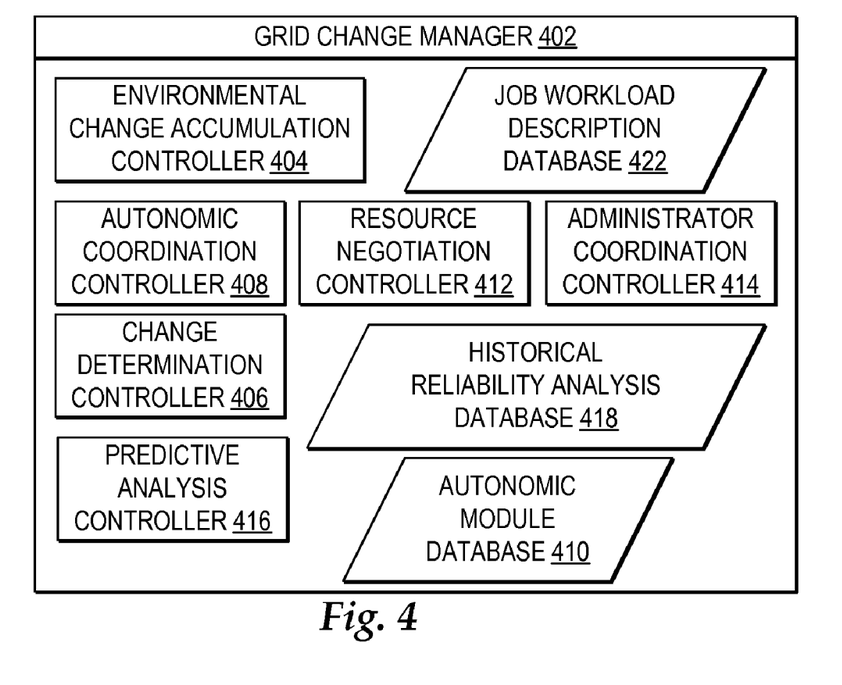
FIG. 4 is a block diagram depicting the components of a grid change manager for monitoring and managing unintended changes within the overall grid environment that may effect grid job performance in accordance with the method, system, and program of the present invention.

With reference now to FIG. 4, there is depicted a block diagram of the components of a grid change manager for monitoring and managing unintended changes within the overall grid environment that may effect grid job performance in accordance with the method, system, and program of the present invention. In particular, grid management system 240 may include a grid change manager 402. Grid change manager monitors grid environment 150 to detect potential indicators of unintended changes and then coordinates resolution of the unintended changes in an effort to maintain the expected performance of a particular grid job within grid environment 150. Unintended changes may include, but are not limited to, errors and exceptions detected within the network, infrastructure, and application layers within grid environment 150, unexpected changes in the grid resource configuration within grid environment 150, and errors within the grid job itself executing within grid environment 150. The overall grid environment may refer to the current state of the configuration and total resource usage within the grid environment and may refer to the status of those resources within a specific execution environment for a grid job.

In particular, grid change manager 402 includes an environmental change accumulation controller 404 to coordinate monitoring grid environment 150 and the jobs executing within grid environment 150 for unintended changes. In one example, environmental change accumulation controller 404 may monitor unintended changes in grid environment 150 by directly monitoring resource usage and job workload within grid environment 150. In another example, environmental change accumulation controller 404 may monitor unintended changes in grid environment 150 by tracking multiple homogeneous and heterogeneous grid modules within grid management system 240 that monitor and manage grid resources within grid environment 150.

Environmental change accumulation controller 404 may track changes at multiple levels within grid environment 150. In one example, environmental change accumulation controller 404 may track grid jobs for error conditions which might have occurred at the application, network, or infrastructure level in which the grid job executes. In another example, environment change accumulation controller 404 may track resources and the configuration of the grid environment as a whole for unintended configuration changes that may effect the grid job executing within grid environment 150.

In addition, in monitoring and tracking grid environment 150 and executing grid jobs within grid environment 150, environmental change accumulation controller 404 may maintain information that describes the current job workload within grid environment 150 and the results of the current jobs executing within specific execution environments within grid environment 150. Current job workload description data 422 may include, but is not limited to, data such as job execution state, job criticality factors, a job to resource dependency chart, and job input and output data.

Further, environmental change accumulation controller 404 may access and store the current performance and quality of service agreements for grid environment 150 and the job description and request for quote agreed to for the job from other modules and databases within grid environment 150. Environmental change accumulation controller 404 stores all gathered data in a historical reliability analysis database 418 for use by a predictive analysis controller 416 in predicting the reliability of grid environment 150.

In addition, grid change manager 402 includes an autonomic coordination controller 408. Autonomic coordination controller 408 determines whether an autonomic manager of a job execution environment within grid environment 150 can manage error recovery of detected unintended changes. In particular, grid change manager 402 may maintain an autonomic manager database 410 that describes the available autonomic managers and the management range within grid environment 150 of each autonomic manager. As will be further described with reference to FIG. 5, autonomic managers within grid management system 150 may manage the detection and recovery from unintended changes, and in particular errors, detected within a particular execution environment within grid environment 150. Thus, autonomic coordination controller 408 may act as an intermediary that passes unintended change information between an autonomic manager of an execution environment and other modules within grid management system 240 that detect changing conditions within grid environment 150 that may effect the execution environment managed by the autonomic manager. In another example, autonomic coordination controller 408 may specifically direct an autonomic manager to respond to and resolve the unintended change.

If grid change manager 402 determines an autonomic manager cannot correct an unintended change within grid environment 150, grid change manager 402 initiates a change determination controller 406 to handle resolution of the unintended change if necessary. First, change determination controller 406 determines whether an unintended change will affect any particular grid job executing, thus making a determination whether any error recovery is necessary. In particular, change determination controller 406 may access the performance and quality of service requirements for the grid environment and may also access the current request for quote (RFQ) information for the job to determine if the unintended change will effect promised performance and quality of service by the grid environmental overall or will effect the specific performance requirements specified in the RFQ for the job. In one example, an RFQ is the request, by the client, describing the performance and workload specifications for a grid job. When a grid environment agrees to the RFQ for the grid job, then the grid environment may agree to maintain certain performance and quality of service requirements for the grid job during execution.

If change determination controller 406 determines that an unintended change will affect a particular currently executing grid job, then change determination controller 406 will identify the grid state and the dependencies of a particular job. As previously described, environmental change accumulation controller 404 may maintain grid state and dependencies in job workload description database 422. In addition, when change determination controller 406 identifies an unintended change that will affect a particular grid job performance, change determination controller 406 may access additional grid state and dependency information. Grid state may indicate grid usage including, but not limited to, percentage of resources in use, other unintended changes currently being processed, on-demand resources available, current jobs executing, future jobs waiting to execute, and other data that indicates the functional state of grid environment 150. Dependency information may indicate job dependencies including, but not limited to, resource usage dependencies, data usage dependencies, related job dependencies, and other requirements that will hinder a grid job from completion if not maintained or met. In one example, a grid job includes a batch of transactions, the results of which are required for a final transaction to be completed, such that related job dependencies are created.

Next, change determination controller 406 may communicate with the grid autonomic managers to determine if one or more of the autonomic managers can recover from the grid change. If one or more of the autonomic managers cannot recover from the grid change, then a resource negotiation controller 412 may coordinate with a grid router to allocate resources for a grid job to resolve the unintended change that affects the grid job. In one example, a grid router is responsible for receiving RFQs for a job and determining which resources will satisfy that request. In another example, responsive to receiving an RFQ, the grid router may request access to additional resources outside grid environment 150 for handling a particular job in the form of an RFQ. For example, grid router may send an RFQ to another grid computing farm requesting a sale of a particular type of grid resource for the time period remaining to complete a grid job that the grid router promised to complete within a particular period of time.

An administration coordination controller 414 within grid change manager 402 determines whether to update a system administrator with the unintended changes within grid environment 150. In one example, multiple system administrators may have access to adjust selections of the resources and resource characteristics within grid environment 150. In particular, administration coordination controller 414 may determine whether an unintended change is of a sufficient complexity or impact that notifying a system administrator of the unintended change within grid environment 150 is necessary. For example, administration coordination controller 414 may determine to always alert a system administrator able to reconfigure network resources any time a network resource related unintended change is detected.

A predictive analysis controller 416 within grid change manager 402 may predict future unintended changes in grid environment 150 and may predict the reliability of grid environment 150 based on monitored grid operational history. Based on the predicted reliability of grid environment 150, the business policies used for determining whether grid environment 150 can handle a grid job or will accept a grid job may be adjusted to compensate for the predicted reliability of grid environment 150 to handle the grid job. It will be understood that predictive analysis controller 416 may also operate independent of grid change manager 402 and may perform predictive analysis of different ranges of grid environments from a particular execution environment to multiple independent grid environments.

First, predictive analysis controller 416 monitors whether grid jobs are completed according to the performance and quality of service promised for each grid job. In addition, predictive analysis controller 416 monitors when unintended changes arise and monitors whether and how each unintended change is resolved. As previously described, grid change manager 402 may initiate environmental change accumulation controller 404 to monitor for unintended changes and then may initiate autonomic coordination controller 408, change determination controller 406, resource negotiation controller 412, and administrative coordination controller 414 to attempt to resolve the unintended change in grid environment 150.

Second, predictive analysis controller 416 calculates a reliability factor based upon previous reliability and based upon the monitored unintended changes and reliability of the grid environment in meeting performance and quality of service promises. In particular, the reliability factor may be effected monitored historic job execution data, event data, environmental data, and job criticality factors. In one example, predictive analysis controller 416 determines that grid environment 150 has a low reliability factor for handling grid jobs requiring database processing because the last ten jobs requiring database processing were not executed within the promised completion time because of a repetitive error. Based on the reliability factor for handling grid jobs requiring database processing, predictive analysis controller 416 may recommend changing business policies for grid environment 150 to avoid or redirect grid jobs requiring database processing until a system administrator or autonomic modules is able to correct the repetitive error.

Figure 5:
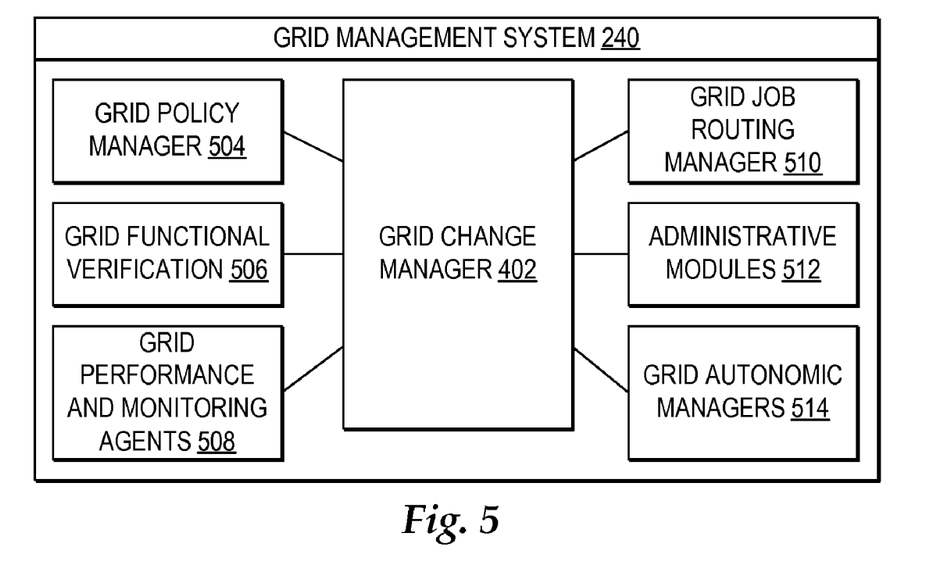
FIG. 5 is a block diagram depicting an example of a grid change manager interacting with other grid modules within a grid environment to detect and manage changes within the grid environment in accordance with the method, system, and program of the present invention.

Referring now to FIG. 5, there is depicted a block diagram of an example of a grid change manager interacting with other grid modules within a grid environment to detect and manage changes within the grid environment in accordance with the method, system, and program of the present invention. As depicted, grid management system 240 includes multiple modules, including a grid change manager 402. In the example, grid change manager 402 communicates with multiple disparate grid modules to monitor and manage changes within grid environment 150. It is important to note that each of the grid modules described within grid management system 240 may be viewed as logical representations of multiple physical instances of each grid module. In addition, it is important to note that additional adapters, mappers, and other conversion mechanisms, although not depicted, may be included within grid management system 240 to enable grid change manager 402 to receive and send communications using multiple, disparate protocols, data types, and network layers.

In one example, grid change manager 402 communicates with grid policy manager 504 to access the policy applied within grid environment 150 by grid management system 240. Grid policy may include, for example, business policies for determining whether to accept grid jobs and determining whether to farm out grid jobs to other grid environments and performance policies for directing performance and quality of service requirements for grid environment 150.

In addition, grid change manager 402 communicates with grid policy manager 504 to redirect the policy applied within grid environment 150 based on reliability factors calculated by predictive analysis controller 416. Grid change manager 402 may redirect policy within grid policy manager 504 as applied, for example, to a current grid job execution environment, to a future grid job execution environment, or to the overall grid environment.

Grid change manager 402 may initiate change recovery workflows by grid automatic managers 514. Grid autonomic managers 514 may include multiple change management and recovery management agents within grid environment 150. In one example, grid autonomic managers 514 include grid network managers that continuously monitor the network status of the multiple networks incorporated into grid environment 150 to detect network events indicating that action is needed. In another example, grid autonomic managers 514 include a resource usage manage that monitors all the resources within grid environment 150 during job execution and resource utilization to detect when resources need to be reallocated or additional resources are needed.

In addition, grid change manager 402 communicates with a grid functional verification agent 506. Grid functional verification agent 506 performs testing and verification of security compliance of each resource within grid environment 150 before the resource is allocated for a specific job execution.

Grid change manager 402 also communicates with grid performance and monitoring agents 508. Grid performance and monitoring agents 508 include multiple controllers, grid modules, and managing agents distributed within grid management system 240 to monitor and manage grid resources. In particular, grid performance and monitoring agents 508 may include multiple disparate types of monitoring and managing agents that communicate in multiple disparate protocols and manage and monitor resources at different architectural levels. For example, one grid monitoring agent may monitor a particular type of network resources, while another grid monitoring agent may monitor a particular type of software resource. Advantageously, grid change manager 402 is enabled to detect and map communications received and sent to the disparate types of grid performance and monitoring agents 508, regardless of the protocol or layer of monitoring and managing.

In addition, grid change manager 402 communicates with a grid job routing manager 510. Grid job routing manager 510 may determine how to route jobs within grid management system 150 and also manage grid job queuing, grid job scheduling, and compilation of a result for a grid job. In addition, grid job routing manager 510 may receive requests for a bid for a grid job in the form of an RFQ, determine whether the resources within grid environment 150 can process the grid job, and return an offer to process the grid job. Further, if an unintended change that affects a grid job is detected, grid job routing manager 510 and grid change manager 402 may communicate to re-negotiate the RFQ with the client requesting the grid job or with an outside grid resource farm providing resources.

Grid change manager 402 may distribute change conditions and resolution requests to administrative modules 512. In addition, grid change manager 402 may distribute predictive reliability factors of grid environment 150 to administrative modules 512. Administrative modules 512 may include both autonomic and human administrator controlled systems that enable administrative control over the configuration of at least portions of the resources within grid environment 150.

Figure 6:
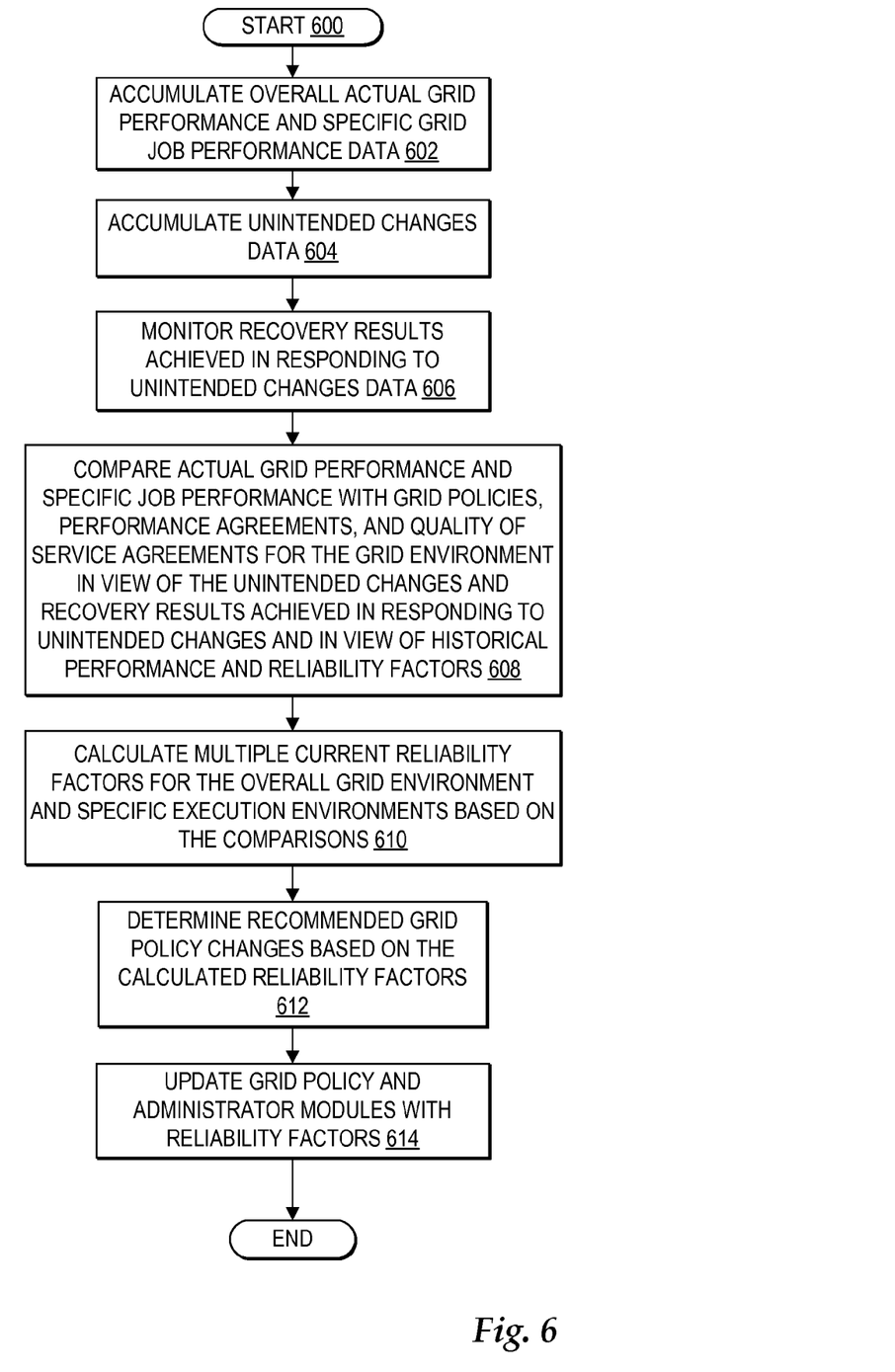
FIG. 6 is a block diagram of a high level logic flowchart of a process and program for performing predictive analysis to predict reliability factors for a grid environment in accordance with the method, system, and program of the present invention.

With reference now to FIG. 6, there is depicted a block diagram of a high level logic flowchart of a process and program for performing predictive analysis to predict reliability factors for a grid environment in accordance with the method, system, and program of the present invention. As depicted, the process starts at block 600 and thereafter proceeds to block 602. Block 602 depicts accumulating overall actual grid performance and specific grid job performance data. Next, block 604 depicts accumulating unintended changes data. Thereafter, block 606 depicts monitoring the recovery results achieved when the grid change manager responds to unintended changes data. Next, block 608 depicts comparing the actual grid performance and specific job performance with grid policies, performance agreements, and quality of service agreements for the grid environment in view of the unintended changes and recovery results achieved in respond to the unintended changes and in view of the historical performance and reliability factors. Next, block 610 depicts calculating multiple current reliability factors and predicted impacts on the overall grid environment and the specific execution environments based on the comparisons. Thereafter, block 612 depicts determining recommended grid policy changes based on the calculated reliability factors. Then, block 614 depicts updating the administrator and grid policy modules with the reliability factors and recommended policy changes, and the process ends.

Figure 7:
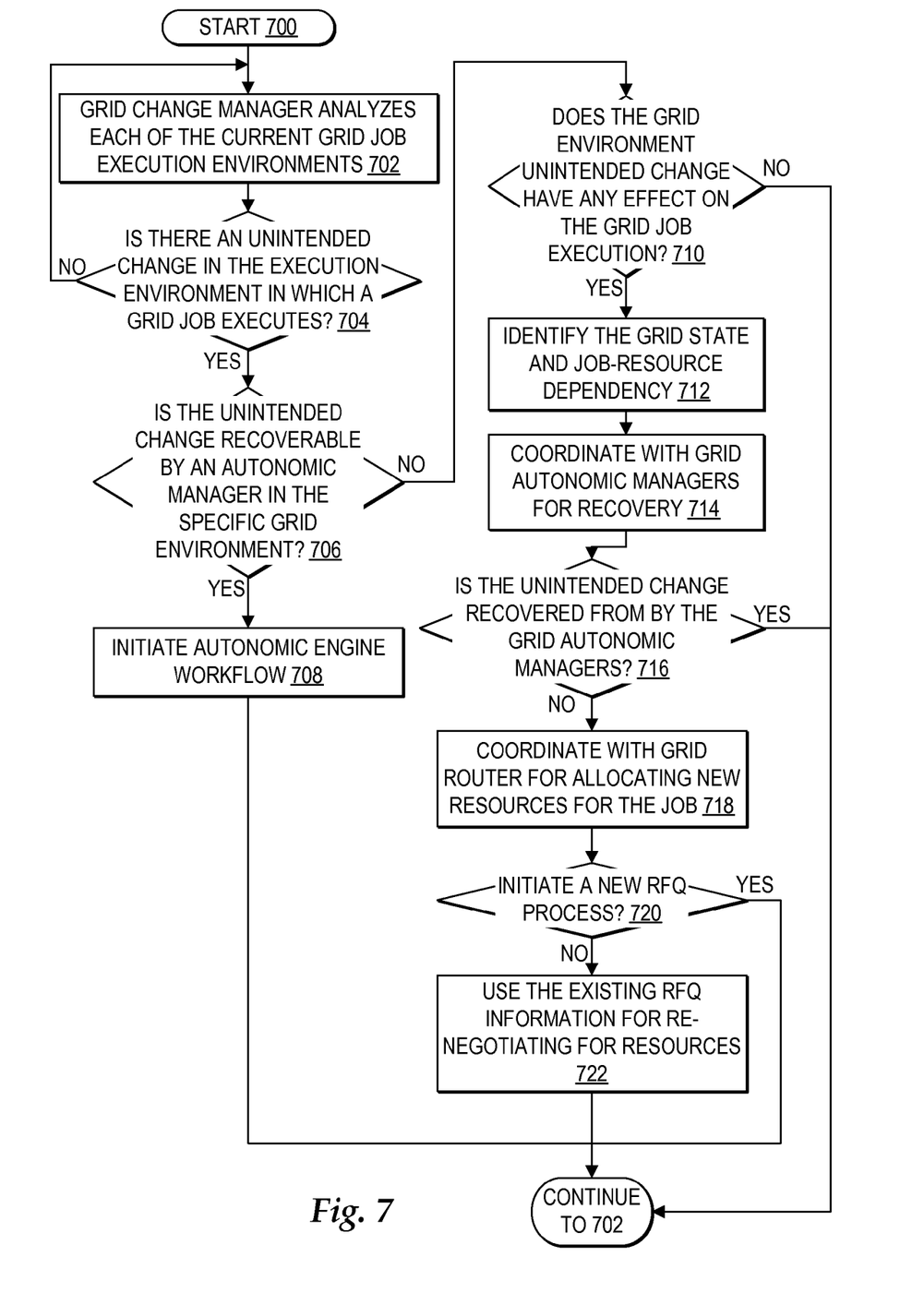
FIG. 7 is a high level logic flowchart of a process and program for coordinating change recovery through multiple modules within a grid environment in accordance with the method, system, and program of the present invention.

Referring now to FIG. 7, there is depicted a high level logic flowchart of a process and program for coordinating change recovery through multiple modules within a grid environment in accordance with the method, system, and program of the present invention. As illustrated, the process starts at block 700 and thereafter proceeds to block 702. Block 702 depicts a grid change manager analyzing each of the current grid job execution environments. Next, block 704 depicts a determination whether there is an unintended change in a grid job execution environment. If there is not an unintended change detected within a grid job execution environment, then the process continues and returns to block 702. If there is an unintended change detected within a grid job execution environment, then the process passes to block 706.

Block 706 depicts a determination whether the unintended change condition is recoverable by an autonomic manager within the specific grid environment. If the unintended change condition is recoverable by an autonomic manager within the specific grid environment, then the process passes to block 708. Block 708 depicts initiating the autonomic engine workflow to handle the unintended change condition, and the process continues to block 702. Otherwise, at block 706, if the unintended change condition is not recoverable by an autonomic manager in the specific grid environment, then the process passes to block 710.

Block 710 depicts a determination whether the unintended change within the grid environment has any effect on the execution of a grid job. If the unintended change within the grid environment does not have an effect on the execution of a grid job, then the process continues to block 702. If the unintended change in the grid environment does have an adverse effect on the execution of a grid job, then the process passes to block 712.

Block 712 depicts identifying the grid state and grid job resource dependencies associated with the effected grid job. Next, block 714 depicts coordinating with the grid automatic managers to determine if the autonomic managers can recover from the unintended change. Thereafter, block 716 depicts a determination whether autonomic managers can control recovery from the unintended change. If the autonomic managers can control recovery from the unintended change, then the process continues to block 702. Otherwise, if the autonomic managers cannot control recovery from the unintended change, then the process passes to block 718. Block 718 depicts coordinating with the grid router for allocating new resources for the job. Next, block 720 depicts a determination whether a new RFQ is initiated by the router. If a new RFQ is initiated by the router, then the process continues. If a new RFQ is not initiated by the router, then the process passes to block 722. Block 722 depicts using the existing RFQ information for renegotiating for resources, and the process continues to block 702.

It is important to note that while the processes described in FIGS. 6 and 7 are described with reference to a grid change manager automatically performing the functions of the process, in alternate embodiments, steps within the process may be performed through human intervention.

While the invention has been particularly shown and described with reference to a preferred embodiment, it will be understood by those skilled in the art that various changes in form and detail may be made therein without departing from the spirit and scope of the invention.

What is claimed is:

1. A computer-implemented system for coordinating recovery from unintended change within a grid environment, comprising:

a grid environment enabling a grid environment comprising a plurality of resources from a plurality of computing systems each comprising at least one resource and communicatively connected over a network layer through a grid management system to share each said at least one resource through at least one web service layer atop at least one grid service layer implemented within an open grid services architecture, wherein a plurality of applications execute in an application layer atop said grid service layer;

said at least one grid service layer comprising a grid change controller;

said grid change controller for monitoring a plurality of potential change indicators from a plurality of resource managers of said grid management system for one of multiple types of errors indicating a first error in at least one from among said network layer, said web service layer, and said application layer, a second error in a particular configuration of said plurality of resources within said grid environment, and a third error in a grid job executing within said grid environment, wherein each of said plurality of resource managers manages one from among a plurality of selections of said plurality of resources within said grid environment;

said grid change controller for detecting a particular potential change indicator from among said plurality of potential change indicators indicating an unintended change within said grid environment;

said grid change controller for determining a necessary response to said unintended change within said grid environment;

said grid change controller for communicating with at least one from among a plurality of independent managers available within said grid environment to resolve said unintended change, such that said grid change controller facilitates recovery from said unintended change within said grid environment to maintain performance requirements within said grid environment;

said grid change controller for gathering a plurality of indicators of actual performance by a plurality of grid jobs executing within said grid environment, said plurality of potential change indicators, and a plurality of recovery results managed by said grid change controller in resolving at least a selection of said plurality of potential change indicators including resolving said unintended change from said particular potential change indicator;

said grid change controller for comparing said plurality of indicators of actual performance with at least one grid policy specifying an expected performance of said plurality of grid jobs executing within said grid environment and with said plurality of recovery results;

said grid change controller for calculating at least one current reliability factor for said grid environment based on said plurality of indicators of actual performance achieved by said grid change controller in recovering from said plurality of potential change indicators based on said plurality of recover results in comparison with said expected performance; and said grid change controller for updating said grid policy specifying said expected performance to reflect said at least one current reliability factor.

2. The computer-implemented system according to claim 1, further comprising said grid change controller for determining whether a selection from among said plurality of independent managers is enabled to control recovery of said grid environment from said unintended change.

3. The computer-implemented system according to claim 1, further comprising said grid change controller for determining whether said unintended change will effect a particular grid job, from among a plurality of grid jobs executing within said grid environment, executing within a specific execution environment within said grid environment.

4. The computer-implemented system according to claim 1, further comprising said grid change controller for determining whether to request that a system administrator attempt to recover said grid environment from said unintended change.

5. The computer-implemented system according to claim 1, further comprising said grid change controller for determining whether to request a change of resources to which a particular grid job effected by said unintended change are routed.

6. The computer-implemented system according to claim 1, further comprising said grid change controller for initiating a recovery workflow for recovery from said unintended change within said at least one independent manager from among said plurality of independent managers, wherein said at least one independent manager automatically controls said recovery within a particular execution environment within said grid environment.

7. The computer-implemented system according to claim 1, further comprising said grid change controller for coordinating with said at least one independent manager to direct recovery from said unintended change by said at least one independent manager.

8. The computer-implemented system according to claim 1, further comprising said grid change controller for coordinating with a grid job router to renegotiate for an allocation of a new selection of resources for processing a particular grid job effected by said unintended change.

9. The computer-implemented system according to claim 1, further comprising said grid change controller for predicting at least one reliability factor indicating a predicted reliability of said grid environment to handle at least one type of grid job based on said detected unintended change and said recovery of said grid environment from said unintended change.

10. A computer program product, residing on a computer readable medium, for coordinating recovery from unintended change within a grid environment, comprising:

means for enabling a grid environment comprising a plurality of resources from a plurality of computing systems each comprising at least one resource and communicatively connected over a network layer through a grid management system to share each said at least one resource through at least one web service layer atop at least one grid service layer implemented within an open grid services architecture, wherein said at least one grid service layer comprises a grid change controller, wherein a plurality of applications execute in an application layer atop said grid service layer;

means for monitoring, by said grid change controller, for a plurality of potential change indicators from a plurality of resource managers of said grid management system for one of multiple types of errors indicating a first error in at least one from among said network layer, said web service layer, and said application layer, a second error in a particular configuration of said plurality of resources within said grid environment, and a third error in a grid job executing within said grid environment, wherein each of said plurality of resource managers manages one from among a plurality of selections of said plurality of resources within said grid environment;

means for detecting, at said grid change controller within a grid environment, a particular potential change indicator from among said plurality of potential change indicators indicating an unintended change within said grid environment;

means for determining, by said grid change controller, a necessary response to said unintended change within said grid environment;

means for communicating, by said grid change controller, with at least one from among a plurality of independent managers available within said grid environment to resolve said unintended change, such that said grid change controller facilitates recovery from said unintended change within said grid environment to maintain performance requirements within said grid environment;

means for gathering, by said grid change controller, a plurality of indicators of actual performance by a plurality of grid jobs executing within said grid environment, said plurality of potential change indicators, and a plurality of recovery results managed by said grid change controller in resolving at least a selection of said plurality of potential change indicators including resolving said unintended change from said particular potential change indicator;

means for comparing said plurality of indicators of actual performance with at least one grid policy specifying an expected performance of said plurality of grid jobs executing within said grid environment and with said plurality of recovery results;

means for calculating at least one current reliability factor for said grid environment based on said plurality of indicators of actual performance achieved by said grid change controller in recovering from said plurality of potential change indicators based on said plurality of recover results in comparison with said expected performance; and means for updating said grid policy specifying said expected performance to reflect said at least one current reliability factor.

11. The computer program product according to claim 10, further comprising:

means for determining whether a selection from among said plurality of independent managers is enabled to control recovery of said grid environment from said unintended change.

12. The computer program product according to claim 10, further comprising:

means for determining whether said unintended change will effect a particular grid job, from among a plurality of grid jobs executing within said grid environment, executing within a specific execution environment within said grid environment.

13. The computer program product according to claim 10, further comprising:

means for determining whether to request that a system administrator attempt to recover said grid environment from said unintended change.

14. The computer program product according to claim 10, further comprising:

means for determining whether to request a change of resources to which a particular grid job effected by said unintended change are routed.

15. The computer program product according to claim 10, further comprising:

means for initiating a recovery workflow for recovery from said unintended change within said at least one independent manager from among said plurality of independent managers, wherein said at least one independent manager automatically controls said recovery within a particular execution environment within said grid environment.

16. The computer program product according to claim 10, further comprising:

means for coordinating with said at least one independent manager to direct recovery from said unintended change by said at least one independent manager.

17. The computer program product according to claim 10, further comprising:

means for coordinating with a grid job router to renegotiate for an allocation of a new selection of resources for processing a particular grid job effected by said unintended change.

18. The computer program product according to claim 10, further comprising:

means for predicting at least one reliability factor indicating a predicted reliability of said grid environment to handle at least one type of grid job based on said detected unintended change and said recovery of said grid environment from said unintended change.

* * * * *